United States Patent [19]

Clemmens et al.

[11] Patent Number: 5,228,335
[45] Date of Patent: Jul. 20, 1993

[54] METHOD AND APPARATUS FOR DETECTION OF CATALYST FAILURE ON-BOARD A MOTOR VEHICLE USING A DUAL OXYGEN SENSOR AND AN ALGORITHM

[75] Inventors: William B. Clemmens, Ann Arbor; John W. Koupal, Ypsilanti; Michael A. Sabourin, Royal Oak, all of Mich.

[73] Assignee: The United States of America as represented by the United States Environmental Protection Agency, Washington, D.C.

[21] Appl. No.: 660,654

[22] Filed: Feb. 25, 1991

[51] Int. Cl.$^5$ .......................................... G01M 19/00
[52] U.S. Cl. .................................................... 73/118.1
[58] Field of Search ................ 60/277; 73/116, 118.1, 73/117.3; 340/632–634; 364/431.04, 431.05

[56] References Cited

U.S. PATENT DOCUMENTS

| | | | |
|---|---|---|---|
| 3,812,711 | 5/1974 | Sorenson | 73/114 |
| 3,939,654 | 2/1976 | Creps | 261/69.1 |
| 3,969,932 | 7/1976 | Rieger et al. | 73/118.1 |
| 4,881,368 | 11/1989 | Demura et al. | 60/274 |
| 5,032,821 | 7/1991 | Domanico et al. | 73/862.04 |

FOREIGN PATENT DOCUMENTS 2177513  1/1977  United Kingdom ................ 73/116

OTHER PUBLICATIONS

Meitzler, Allen H., Application of Exhaust-Gas-Oxygen Sensors to the Study of Storage Effects in Automotive Three-Way Catalysts, Sae 800019, 1980.

*Primary Examiner*—Robert Raevis
*Attorney, Agent, or Firm*—James M. Deimen

[57] ABSTRACT

Dual oxygen sensors before and after the exhaust catalytic converter of a motor vehicle combined with a specialized algorithm to substantially continuously compare the real time electric output of the oxygen sensors and, in response to the comparison, output an indication of the activity of the catalyst and failure of the catalyst. The algorithm in substantially real time "monitors" the continuously changing oxygen content of the before and after catalyst exhaust stream and through a phase comparison or an integration process in the preferred embodiment makes the proper comparison for determination of catalyst acceptability or failure. With a microcomputer equipped motor vehicle the algorithm is suitable for on-board continuous monitoring of the exhaust catalyst for indication to the vehicle operator when catalyst failure occurs. Failure can be total catalyst failure or partial failure to a degree where Federal exhaust emissions regulations are no longer met. The algorithm includes filter subroutines to "filter" out momentary excursions of oxygen sensor output due to momentary excursions of overly rich air/fuel ratios. Thus, the algorithm screens out momentary excursions of exhaust air/fuel ratio that even a properly functioning catalyst would be unable to convert and control.

10 Claims, 5 Drawing Sheets

METHOD AND APPARATUS FOR DETECTION OF CATALYST FAILURE ON-BOARD A MOTOR VEHICLE USING A DUAL OXYGEN SENSOR AND AN ALGORITHM

BACKGROUND OF THE INVENTION

The field of the invention pertains to motor vehicle exhaust catalytic converters and, in particular, to the detection of the failure of such catalytic converters during normal vehicle operation.

To address air quality problems in our most polluted cities, those charged with the responsibility to clean up the air are increasingly concerned with in-use motor vehicle emissions in addition to new car compliance programs. One of the most visible programs is the inspection and maintenance program now enforced in a number of populated regions of the United States. As vehicle technology has become more sophisticated, the use of the vehicles' electronic control system to identify its own malfunctions has become a viable strategy for supplementing or enhancing traditional inspection and maintenance programs.

Until recently no need for on-board exhaust emissions diagnostics technology was exhibited because no requirements were coming into force. Motor vehicle on-board diagnostic monitoring systems were first required in the State of California beginning in the 1988 model year. The first generation system, monitoring only exhaust gas recirculation and fuel system performance, had limited diagnostic capabilities. Recognizing that malfunctions of other vehicle emissions control systems such as the secondary air system, evaporative control system, and the catalytic converter can also significantly affect motor vehicle emissions, the State of California adopted second generation on-board diagnostic system requirements applicable to 1994 and later model year vehicles.

Concurrent with the State of California regulations, the U.S. Environmental Protection Agency initiated the development of Federal on-board diagnostic regulations. The recently enacted Clean Air Act Amendments of 1990 specifically require the monitoring of catalysts and oxygen sensors in the exhaust stream by the on-board diagnostic system.

The use of a post-catalyst oxygen sensor is known from a study published in 1980 by A. H. Meitzler, Society of Automotive Engineers (SAE paper 800019). The response delay of a downstream oxygen sensor to an instantaneous air/fuel shift is used as an indicator of an exhaust catalyst's oxygen storage mechanisms. In more recent years, at least one automotive manufacturer has used a downstream oxygen sensor (in combination with an upstream sensor) in a limited capacity as part of the vehicle's fuel control feedback loop.

SUMMARY OF THE INVENTION

The invention comprises dual oxygen sensors before and after the exhaust catalytic converter and a new algorithm in a vehicle on-board micro processor for detecting converter degradation from the changes in the exhaust stream. The dual oxygen sensors and algorithm for catalyst failure detection is based on the catalyst's oxygen storage capability and the catalyst's oxidation conversion efficiency. Together they comprise the catalyst's oxygen activity.

The theoretical basis for the invention arises from the oxidation properties of a properly operating catalyst and a failing catalyst. In theory a properly operating catalyst promotes the complete reaction between free oxygen in the exhaust stream and reducing agents in the exhaust stream resulting in the ideal products of combustion, i.e. carbon dioxide and water vapor. As a result the post catalyst exhaust stream is composed primarily of these products, and has a low concentration of reducing agents. The lack of oxygen and low concentration of reducing agents in the exhaust stream leads to a decrease in oxidation/reduction activity at the platinum electrode of an oxygen sensor exposed to the post-catalyst exhaust stream. A warmed-up sensor placed downstream of a properly operating catalyst under steady state operating conditions will tend to stabilize with low fluctuations in the output response pattern. This output will bear little relationship to the output fluctuation of the sensor upstream of the catalyst.

On the other hand, a catalyst can be adversely affected by thermal degradation, resulting in surface area loss and/or noble metal sintering. Catalyst poisoning from phosphorus, lead or sulfur can also impact the performance of the catalyst. Such deterioration results in a loss in the oxidation activity (storage and/or conversion) of the catalyst. Decreases in the catalyst's ability to convert the reducing agents in the exhaust stream results in free oxygen passing through the catalyst unreacted during lean operation of the motor vehicle engine. Thus, the post-catalyst exhaust stream reflects the decrease of conversion activity with more rich-to-lean fluctuation of oxygen, as a result of the increase in untreated exhaust passing through the catalyst.

In theory the voltage response of a warmed-up oxygen sensor placed downstream of a deteriorated catalyst under substantially steady state operating conditions tends to fluctuate with the changes in downstream exhaust oxygen content. The voltage response in fact tends to approach the voltage response pattern of the pre-catalyst oxygen sensor exposed to untreated exhaust oxygen content as the storage and conversion activity of the catalyst approaches negligible levels.

The change in free oxygen concentration in the exhaust stream through the catalyst is detected by the change in voltage response patterns between the before and after catalyst oxygen sensors. During substantially steady state motor vehicle operation the before catalyst oxygen sensor reflects oscillations in the oxygen content of the exhaust stream caused by fuel system perturbations. When the catalyst is operating properly, it dampens the fluctuations in oxygen content, thus, the after catalyst sensor produces a distinguishably different sensor response pattern from that obtained from the before catalyst sensor.

With the catalyst totally deteriorated, the catalyst oxygen conversion efficiency and oxygen storage capability are mostly, if not totally, lost. Therefore, the oxygen content of the exhaust stream post catalyst much more resembles the oxygen content before the catalyst and therefore the response patterns of the before and after sensors much more resemble each other. However, the system is very dynamic and non-linear as the catalyst deteriorates with use over time. The ever changing oxygen storage capability of the catalyst makes a simple moment by moment comparison of voltage or frequency sensor output non-determinative of catalyst adequacy or failure. Rather, the more sophisticated substantially real time phase difference, crossing ratio, and integration methods applied by the algorithms below result in a successful means of substantially real time determination of catalyst adequacy or failure. Moreover, failure for regulatory purposes is not total failure but rather some determinable point of partial failure of the catalyst.

In support of the State of California second generation on-board diagnostic system regulations and anticipated Federal regulations, evaluation tests were conducted of various methods to identify catalyst malperformance and failure. The methods tested were first conducted under closely controlled engine dynamometer conditions. Upon successful engine dynamometer tests, concerns were raised that the new dual oxygen sensor and algorithm may not be transferable to a motor vehicle under real-world operating conditions.

Therefore, on-board motor vehicle testing was conducted to evaluate and prove the ability of the dual oxygen sensor and algorithm catalyst evaluation method and apparatus to identify serious losses in catalyst efficiency under actual vehicle operating conditions. A test vehicle was operated over the Environmental Protection Agency Federal Test Procedure and the test successfully showed that the new dual oxygen sensor and algorithm can distinguish between properly operating catalytic converters and poorly operating catalytic converters.

Incorporated by reference in this application are William B. Clemmens, Michael A. Sabourin and Thomas Rao, "Detection of Catalyst Performance Loss Using On-Board Diagnostics", (SAE 900062) 1990 and John Koupal, Michael Sabourin and William B. Clemmens, "Detection Of Catalyst Failure On-Vehicle Using The Dual Oxygen Sensor Method", (SAE 910561), 1991.

DESCRIPTION OF THE PREFERRED EMBODIMENTS

Figure 1:
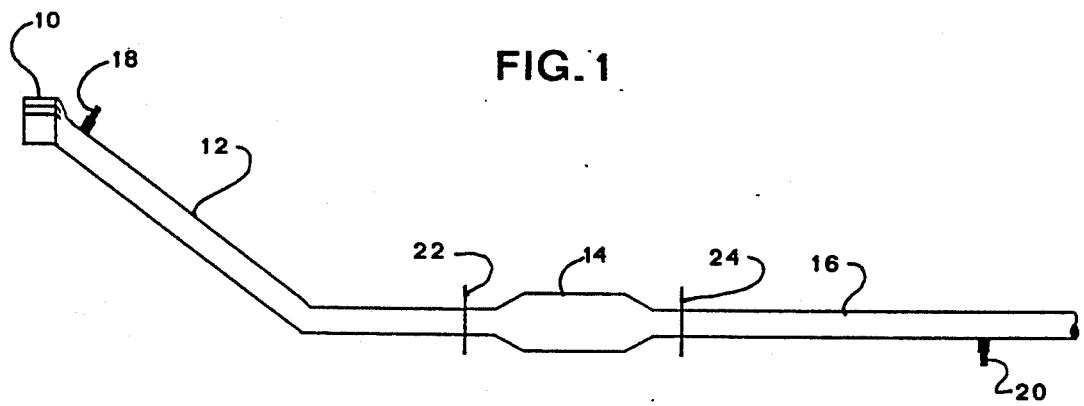
FIG. 1 is a schematic representation of a simple catalytic converter exhaust system.

FIG. 1 illustrates a simple exhaust system comprising an exhaust manifold 10, an exhaust pipe 12, a catalytic converter 14 containing the catalyst and a tailpipe 16. Attached to the exhaust pipe 12 is an oxygen sensor 18 in communication with the exhaust stream within the pipe. A second oxygen sensor 20 is attached to the tail pipe 16 and is also in communication with the exhaust stream from the motor vehicle engine. The catalytic converter 14 is welded or mechanically fastened to the exhaust pipe 12 and tail pipe 16 at the flanges 22 and 24 in a gas tight manner.

Figure 2:
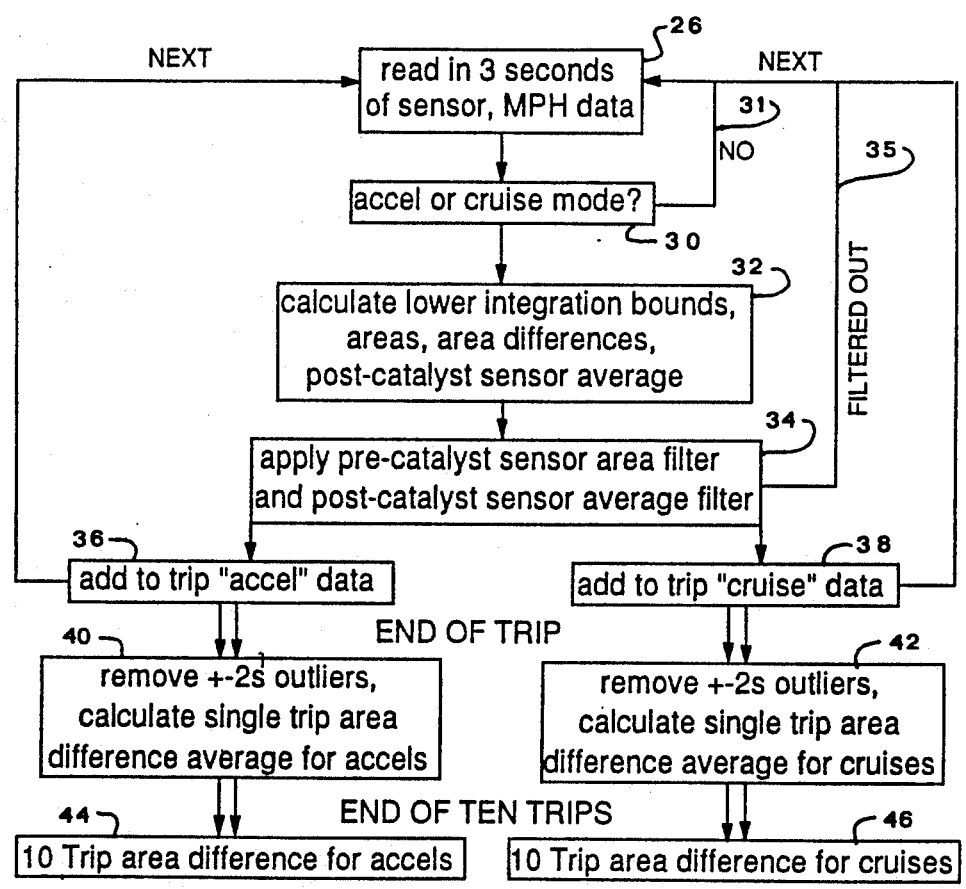
FIG. 2 is a flow diagram of the algorithm for determining catalyst failure.
Figure 3:
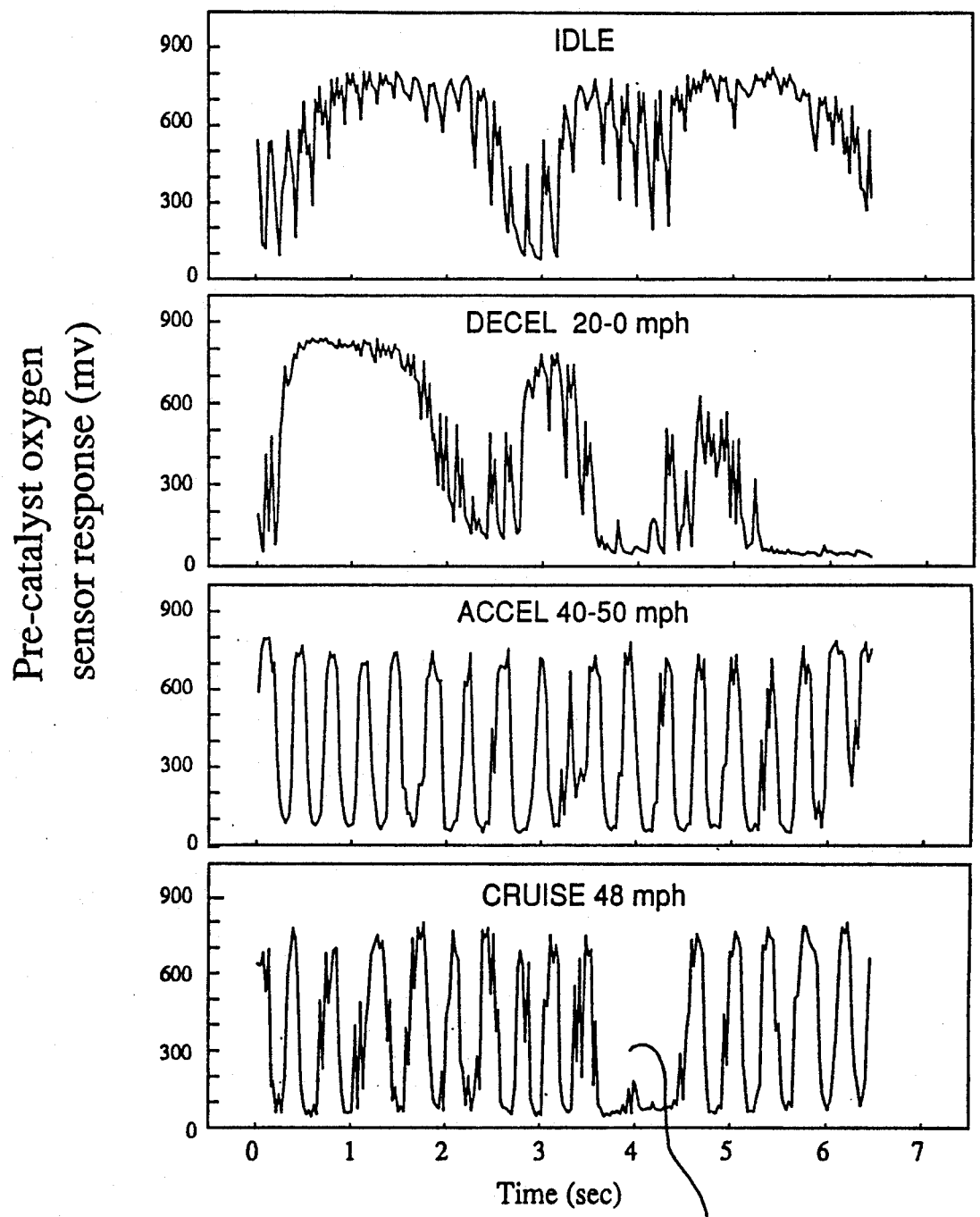
FIG. 3 is a set of output graphs for a before catalyst oxygen sensor.

The electrical outputs of the before 18 and after 20 oxygen sensors are fed to an on-board vehicle computer containing an algorithm shown in the flow diagram of FIG. 2. In box 26 the sensor outputs are read over a specified interval of seconds. Optionally, a factor may be applied for the time delay of the exhaust stream to reach the after catalyst 20 from the before catalyst sensor 18. Also read concurrently is the miles per hour (MPH) speed of the vehicle. FIG. 3 illustrates by example the before catalyst 18 sensor response or output for four motor vehicle operating conditions. Clearly, the idle and deceleration modes provide a relatively irregular response in comparison with the acceleration and cruise modes. However, the cruise mode illustrates a not infrequent anomaly 28 that can occur in any mode as a result of momentarily sudden excursions in fuel/air ratio despite steady-state (cruise) operation of the vehicle.

Returning to FIG. 2, acceleration or cruise mode 30 of the vehicle is determined by changes in miles per hour if idle or deceleration a return loop applied 31. The detection of catalyst failure may be performed under acceleration or cruise mode with the initial calculations, more fully disclosed below, performed at 32, followed by filtering calculations at 34 to remove perturbations 35 arising from momentary sudden excursions in fuel/air mixture. Whether in acceleration mode 36 or cruise mode 38 a statistical test is applied at 40 or 42 and the results combined with a specified number of previous intervals at 44 and 46. In FIG. 2 the three second test interval for sensor outputs at 26 and the removal of 2 standard deviation outliers in the statistical tests at 40 and 42 were successful for the test program but different intervals and outliers might be selected.

Figure 4:
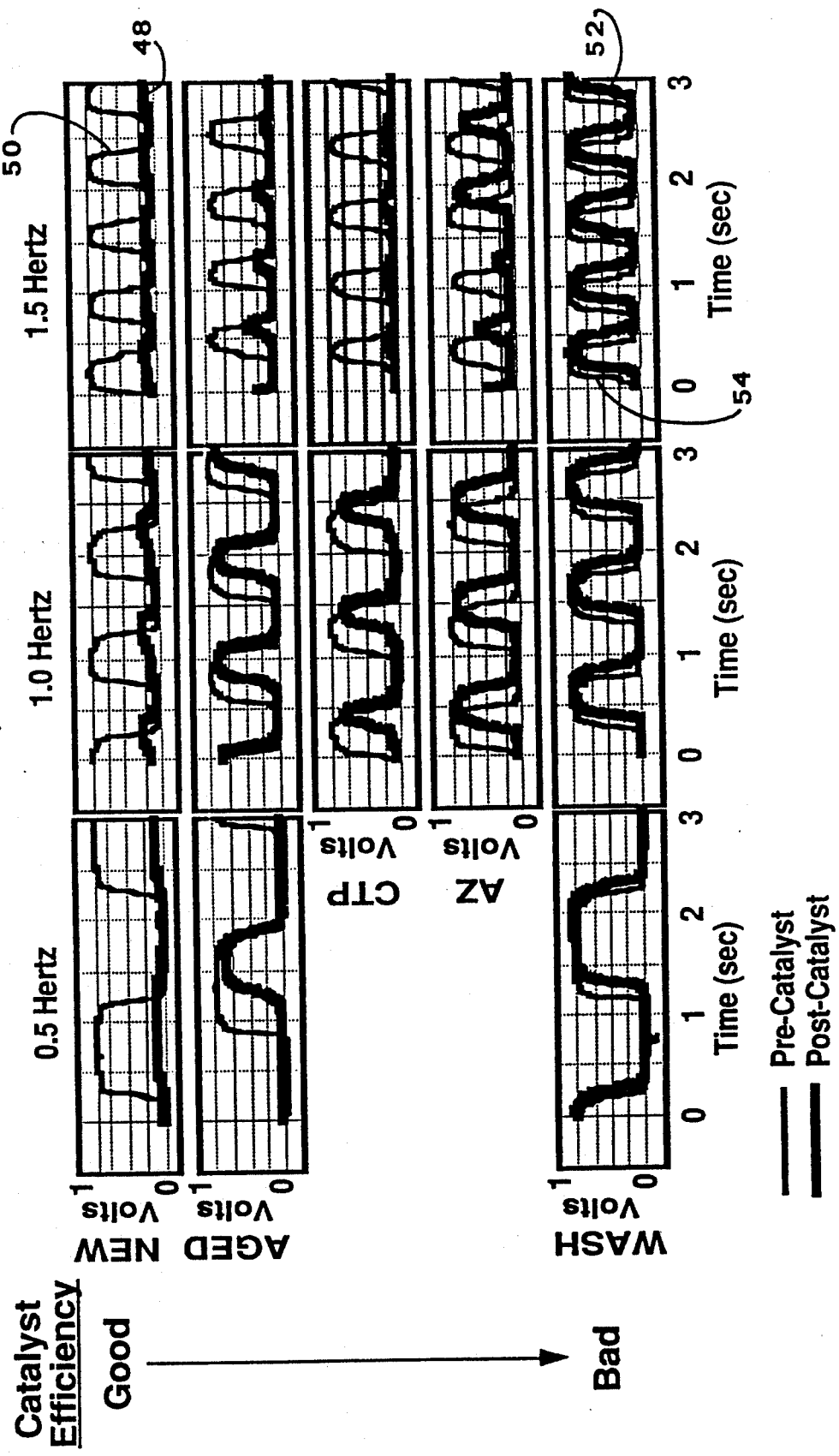
FIG. 4 is a comparison of oxygen sensor output versus catalyst efficiency.

The initial test program for development of a suitable algorithm is disclosed in detail in the first paper, SAE 900062, incorporated by reference above. The program comprised dynamometer tests under controlled environmental conditions. Catalysts of five differing efficiencies or activities were selected for the tests. FIG. 4 illustrates in summary the results of the tests in terms of the instantaneous voltage outputs of the pre-catalyst and post catalyst oxygen sensors.

In FIG. 4 the "Swing" refers to the change in air/fuel ratio about stoichiometry and the frequencies in Hertz to the frequency of swing. The CTP and AZ catalysts were in converters that had been used abused under in service conditions. The WASH "catalyst" was absent the noble metals that provide the catalytic activity. FIG. 4 clearly illustrates two important phenomena. Firstly, the post-catalyst sensor output 48 bears very little resemblance to the pre-catalyst sensor output 50 for the NEW catalyst. At the other extreme the post-catalyst sensor output 52 almost matches the pre-catalyst 54 sensor output for the WASH catalyst. The test program made clear that a "phase difference" approach to discriminating good from bad catalysts looked promising. In addition, a ratio between the post- and pre- sensors of the number of response crossings of an established voltage value also appeared promising as did an "integration" approach.

In the phase difference approach the time delay between pre-catalyst sensor output above a selected threshold voltage and the post-catalyst sensor output above the threshold voltage would be significantly greater for a catalyst with better oxygen utilization than a catalyst with poor oxygen utilization. The tests showed that this approach is feasible with an on-board diagnostic system, however, data scatter problems resulted in the search for a more sophisticated approach.

In the response crossing method, the number of times the pre-catalyst sensor crosses a selectable voltage threshold is divided into the number of times the post sensor also crosses the same threshold level. This crossing ratio technique does not suffer from data scatter and is conducive to statistical sampling techniques, but does suffer from a low sensitivity of the conversion efficiency to crossing ratio in the middle conversion efficiency ranges. With the original goal of identifying catalysts that had deteriorated to mid-level steady-state conversion efficiencies, a more sensitive technique was desired. However, as the need to identify upper mid-level catalyst efficiencies on the transient Federal Test Procedure (FTP), which would result in high levels of conversion efficiency on a steady-state test, becomes more apparent, the crossing ratio test may provide very acceptable results.

Figure 5A:
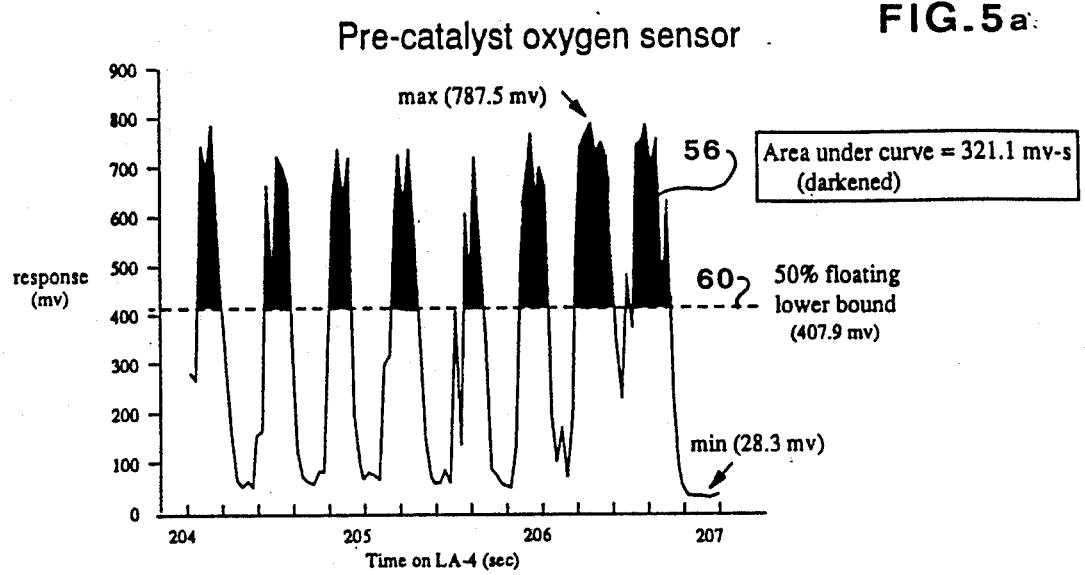
FIGS. 5a and 5b illustrate the integrated area difference method for a real world vehicle.
Figure 5B:
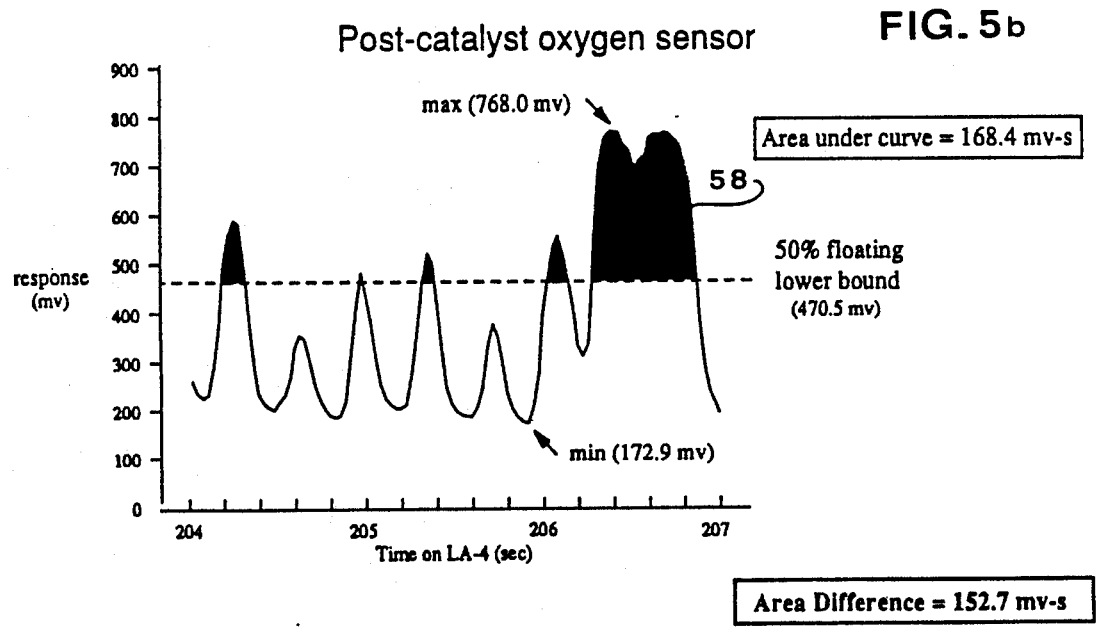

As a result of searching for a more sensitive method for determining catalysts deteriorated to a mid-level efficiency based on a steady-state test the integrated difference method of measuring the areas under the voltage output curves and comparing the areas was developed. In this method the area under the pre-catalyst and post-catalyst sensor output curves is integrated above a specified threshold value in the dynamometer tests and in the subsequent on-vehicle real world tests with a "floating lower bound" (SAE 900062 and SAE 910561 respectively, incorporated by reference above). The pre-56 and post-58 catalyst areas are then compared as illustrated in FIGS. 5a and 5b. The areas may be determined by trapezoidal integration or some other suitable integration method.

The floating lower bound 60 is found by taking a percentage (50% as shown in FIG. 5) of the difference between the maximum and minimum sensor voltages over the measuring interval. The advantage to the floating lower bound is in the accommodation of changes in sensor output due to variabilities in real world vehicle operation and changes in sensor output from sensor ageing. The floating lower bound also partially accommodates extended rich air/fuel excursions. The calculations over the specified interval are performed at 32 in FIG. 2. The floating lower bound calculation may be based on millivolts as shown in FIG. 5 or the values normalized on a 0-100% scale between the maximum and minimum for each sensor. The effects of sensor ageing thus become less important with the normalized comparisons. Also, with this technique, any response differences between the pre- and post-catalyst sensor also becomes less important and thus provides a more equal comparison.

In normal vehicle operation the catalytic convertor operates most efficiently when the exhaust air/fuel ratio remains within a tight range around the stoichiometric air/fuel ratio. During normal vehicle operation occasions occur when vehicle driveability or performance needs require engine operating conditions that cause the exhaust air/fuel ratio to drift outside the range that facilitates effective catalytic conversion. During these conditions, even a properly converting catalyst will perform poorly. Since these exhaust excursions are a small percentage of overall vehicle operation, the catalytic convertor is on average a very effective emission control device.

To avoid catalyst performance evaluation during an exhaust excursion out of range which would inaccurately indicate poor catalytic activity, filter algorithms are included at 34 in FIG. 2. The filter algorithms are based on the screening of two parameters: the area of the pre-catalyst oxygen sensor response curve and the average value of the post-catalyst oxygen sensor response voltage.

The pre-catalyst oxygen sensor area filter screens out those areas calculated over the specified interval which are outside of a predetermined range of area values. The minimum area value eliminates events with insufficiently rich air/fuel excursions to properly actuate the sensor or of insufficient duration to properly actuate the sensor. The maximum area value eliminates excessively large rich air/fuel excursions or rich air/fuel excursions of excessive duration.

The post-catalyst oxygen sensor average filter increases the effectiveness of screening out rich air/fuel excursions. A rich exhaust mixture after the catalyst is a good indication that the exhaust entering the catalyst was rich of stoichiometry and, therefore, did not provide an exhaust air/fuel ratio condition necessary for good oxidation of the catalyst.

Figure 6:
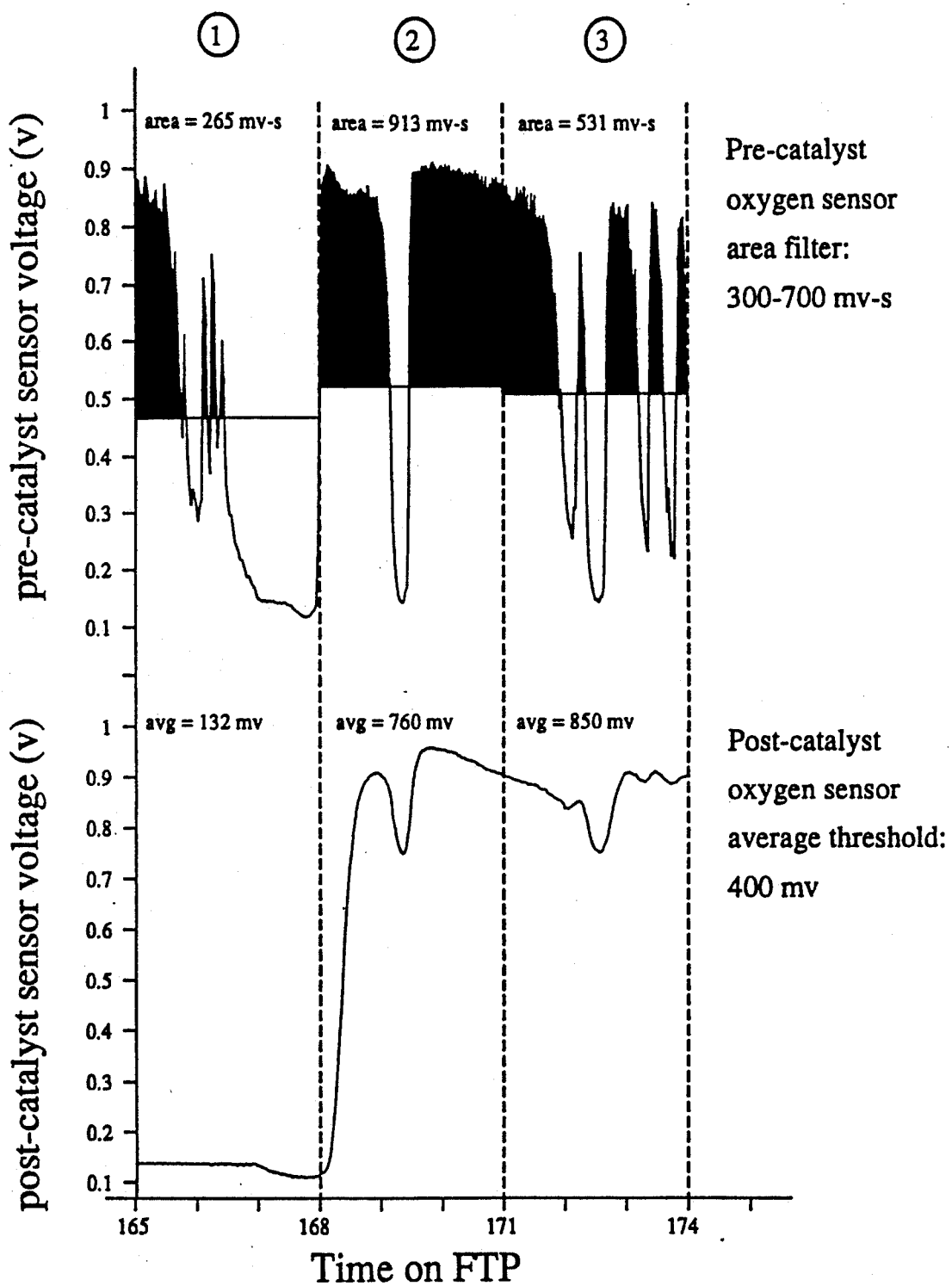
FIG. 6 illustrates the out-of-range filtering for the integrated area difference method.

FIG. 6 visually illustrates the impact of the pre-catalyst sensor area and post catalyst sensor average filters wherein the area range in the former is limited to 300-700 millivolt-seconds and the average in the latter is limited to a 400 millivolts maximum.

Column 1 is filtered out by the pre-catalyst area filter as a result of a lean excursion (low area value). Column 2 is filtered out by both pre-and post-catalyst filters as a result of a rich excursion affecting both sensors. Column 3 is filtered out by the post-catalyst average filter as a result of the rich excursion still affecting the post-catalyst sensor response.

As a summarizing example with reference to the flow diagram of FIG. 2, the algorithm performs as follows:
a. isolate three seconds of pre-catalyst sensor response data and the corresponding lag-corrected post-catalyst sensor response data;
b. determine the lower integration bounds for each sensor based on the respective maximum/minimum values;
c. calculate the wave form areas based on these lower bounds;
d. calculate the average voltage value of the post-catalyst oxygen sensor response voltage;
e. subject the pre-catalyst sensor area and post-catalyst sensor average value to the corresponding filter threshold;
f. determine the area difference for the three second block, add to trip area difference data base;
g. at the end of the trip, calculate the trip average area difference based on all the three second blocks accumulated during the trips;
h. after accumulating ten trip average area difference value, average the ten values;
i. compare this final trip average area difference value with some predetermined "trigger level" for determination of catalyst failure.

The predetermined trigger level may be a specified millivolt-second value as a minimum integrated area difference value below which a signal to the vehicle operator is generated to indicate catalyst failure and the need for replacement.

We claim:
1. Apparatus for detecting motor vehicle exhaust gas catalytic converter deterioration comprising a first exhaust gas oxygen sensor adapted for communication with an exhaust stream before passage of the exhaust stream through a catalytic converter and a second exhaust gas oxygen sensor adapted for communication with the exhaust stream after passage of the exhaust stream through the catalytic converter, an on-board vehicle computational means, said computational means adapted to accept oxygen content signals from the before and after catalytic converter oxygen sensors and adapted to generate signal threshold values, said computational means adapted to compare over repeated time intervals the oxygen content signals to the signal threshold values and to store the output of the compared oxygen content signals, and in response after a specified number of time intervals for a specified mode of motor vehicle operation to determine and indicate a level of catalyst deterioration.

2. The method of detecting motor vehicle exhaust gas catalytic converter deterioration comprising the steps of electrically detecting the oxygen content of exhaust gas before and after passage through a catalytic converter, communicating the electrical signals reflecting the before and after oxygen content to computational means, said computational means including means establishing electrical signal threshold values, integrating the area between the oxygen content electrical signal and an established lower integration bound for a specified time interval and for the before and after oxygen contents, calculating the integrated area difference between the before and after oxygen content electrical signals, and comparing the integrated area difference with an established area value and in response thereto determining and indicating a level of catalyst deterioration.

3. The method of claim 2 including the steps of, calculating an average level of after oxygen content electrical signal, establishing an after oxygen content electrical signal threshold voltage value and comparing the average level with the threshold value of the after oxygen content electrical signal.

4. The method of claim 2 including the steps of, establishing a before oxygen content electrical signal integrated area threshold value and comparing the before oxygen content electrical signal integrated area with the integrated area threshold value for the before oxygen content electrical signal.

5. The method of claim 2 including the steps of, determining the upper and lower limits of the before oxygen content electrical signal during the specified time interval, calculating the difference between the upper and lower limits and calculating a specified percentage of the difference to add to the lower limit and thereby establish a floating lower integration bound.

6. The method of claim 2 including the steps of, determining the upper and lower limits of the before oxygen content electrical signal during the specified time interval, calculating the difference between the upper and lower limits and normalizing the difference between the upper and lower limits, and calculating a specified percentage of the normalized difference to thereby establish a floating lower integration bound.

7. The method of claim 2 including the steps of, entering the integrated area differences for each specified time interval into a data base, and, collecting and averaging a specified number of the integrated area differences before comparing with the established area value.

8. The method of claim 2 including the steps of, measuring the speed of the motor vehicle, and from a series of speed measurements determining the mode of vehicle operation.

9. The method of claim 2 including the steps of, determining the upper and lower limits of the after oxygen content electrical signal during the specified time interval, calculating the difference between the upper and lower limits and calculating a specified percentage of the difference to add to the lower limit and thereby establish a floating lower integration bound.

10. The method of claim 2 including the steps of, determining the upper and lower limits of the after oxygen content electrical signal during the specified time interval, calculating the difference between the upper and lower limits and normalizing the difference between the upper and lower limits, and calculating a specified percentage of the normalized difference to thereby establish a floating lower integration bound.

* * * * *